3,304,230
LIQUID AEROSOL PROPELLANT SOLUTIONS OF FATTY ACID SALTS OF PHYSIOLOGICALLY ACTIVE AMINES
Bernard Abramson, White Plains, and Morris S. Herstein, Bronx, N.Y., assignors to Revlon, Inc., New York, N.Y., a corporation of Delaware
No Drawing. Filed Feb. 18, 1963, Ser. No. 259,406
10 Claims. (Cl. 167—82)

This invention relates to certain amine salts soluble both in water and in volatile organic solvents commonly used as aerosol propellants, to methods for making said salts, to aerosol compositions containing said salts, and to methods of making such aerosol compositions.

Numerous amine materials which are normally water soluble can only be dispersed with difficulty in the volatile organic solvents commonly used as aerosol propellants, such as volatile fluorohydrocarbons. Although the solution of amine materials, particularly of physiologically active amines such as antihistamines and adrenergic amines (e.g. stimulant and vasoconstrictor amines), in aerosol propellants has been accomplished in the prior art, the prior art techniques involve the use of co-solvent to make the water-soluble amine materials compatible with the organic propellant fluids. In these prior art compositions, the water-soluble amine materials are commonly used in the form of their maleate salts. Solution of these salts in a propellant fluid requires the presence of a polar co-solvent material such as ethyl alcohol. Also, prior art compositions may require the presence of water therein.

The prior art compositions have numerous disadvantages. Because of the limited mutual compatibility of the amines, the aerosol propellants, and the co-solvents, satisfactory combinations of specific materials are few in number and do not offer much possibility for variation in the preparation of amine-containing compositions. The mere presence of a co-solvent such as alcohol or of water, may render the resulting compositions of only limited stability. Further, the presence of a co-solvent may prevent the combination of other desirable active ingredients with the amines. Also, because co-solvent materials such as ethyl alcohol are usually present in high concentration in compositions which require a co-solvent, and because such co-solvent materials are usually less volatile than the aerosol propellants with which they are employed, flashing off of the propellant solvents may leave an undesirable residue of the co-solvent. For example, application to the skin of a composition containing a co-solvent material may leave an undesirable film of the co-solvent on the skin when the highly volatile aerosol propellant materials evaporate. Finally, the prior art maleate salts of amine materials suitable for oral ingestion have a bitter and unpleasant taste which hinders their use in administration by inhalation for example.

According to the present invention, it has been found that by forming salts between certain water-soluble amine materials and monocarboxylic fatty acids, materials are obtained which are soluble in conventional aerosol propellant fluids and which still retain water solubility. The materials of the invention have, for example, a minimum propellant solubility of at least about 0.5 percent, by weight of the solvent, and a minimum water solubility of at least about 1 percent, by weight of the solvent. For physiologically active amine materials such as the antihistamines and adrenergic amines, the retention of water solubility in the salt derivatives is essential to their effective physiological activity. The fatty acid amine salts of the invention can be dissolved in a wide variety of conventional aerosol propellants, without the need for co-solvent materials, to form stable compositions, which may be anhydrous. These compositions may also contain a wide variety of other dissolved or dispersed active or inert materials which might be incompatible with the composition if a co-solvent were present. Indeed, if finely-divided insoluble additives are present, the salts of the invention act as suspending and dispersing agents therefor. Aerosol compositions containing the fatty acid amine salts of the invention can be employed to apply the amine salts in a substantially pure deposit thereof: no undesirable co-solvent residues remain, for example on topical application of the aerosol compositions of the invention. Since alcohol need not be present, the irritation caused by alcohol to mucous membranes or open wounds is obviated. For oral ingestion, the fatty acid salts of the invention have a substantially less bitter taste than the salts heretofore used in the art. Also, when the fatty acid salts of the invention are employed as the contents of packaged aerosol units, the materials act as lubricants for the valves of the propellant packages. Finally, propellant compositions containing the dissolved amine salts of the invention are superior to amine suspensions or dispersions because the former are more homogeneous—permitting accurate dosing and yielding a finer aerosol particle size.

The fatty acid salts contemplated according to the invention are those of monocarboxylic fatty acids having from 4 to 18 carbon atoms, preferably from 12 to 18 carbon atoms. The acids may be saturated or unsaturated, and include such monocarboxylic unsubstituted and hydroxy-substituted aliphatic acids as butyric acid, undecylenic acid, lauric acid, myristic acid, stearic acid, hydroxystearic acid, oleic acid, and the like. Particularly useful amine salts are those of lauric, myristic, oleic and stearic acids.

As amines suitable for forming salts according to the invention are those materials having a $pK_a$ value of at least about 7.8, preferably between about 7.8 and about 10.1. The $pK_a$ value is defined as $-\log K_a$, where $K_a$ is the equilibrium constant for the reaction $$B + H_3O^+ \rightarrow HB^+ + H_2O$$

In the equation B is a basic substance, such as an amine, $HB^+$ is the acidic or protonated form of the base, and $H_3O^+$ is a solvated proton. The $pK_a$, thus, is a measure of the basicity of an amine.

Although numerous amine materials will have a $pK_a$ value suitable for forming fatty acid salts according to the invention, the amine materials of greatest interest for dispersion in aerosol propellants are those materials which are physiologically active, such as the antihistamines or adrenergic amines. These physiologically active materials include, but are by no means limited to, materials such as ethanolamine derivatives of the structure

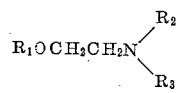

where $R_1$ is an aromatic radical which may be of complicated structure, and $R_2$ and $R_3$ are alkyl radicals. Typical amines of this class are diphenhydramine, bromodiphenhydramine, doxylamine, phenyltoloxamine, and carbinoxamine. Other physiologically active amines are ethylene diamine derivatives of the formula

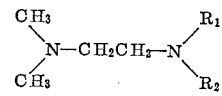

where $R_1$ is an aromatic ring, and $R_2$ is an aliphatic, cycloaliphatic, or aromatic group. Amines of this type include methapheniline, pyrilamine, tripelennamine, methapyrilene, chlorothen, thenyldiamine, methafurylene, thonzylamine, and the like. Still other physiologically active amines are propylamine derivatives such as pheniramine, chlorpheniramine, brompheniramine, pyrrobutamine, and triprolidine. Other amines such as promethazine, pyrathiazine, trimeprazine, methdilazine, and isothipendil are related to phenylthiazine. Adrenergic amines such as ephedrine, epinephrine, and their derivatives have the structure

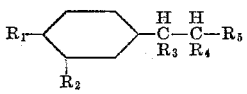

where $R_1$ and $R_2$ are hydrogen or hydroxy groups, $R_3$ is hydrogen, hydroxy, or alkyl, $R_4$ is an amino or alkylamino group, and $R_5$ is hydrogen or an alkyl group. In addition to ephedrine and epinephrine, this family includes amines such as norepinephrine, isoproterenol, phenylephrine, butanefrin, amphetamine, and vonedrine. Finally, numerous physiologically active amines have miscellaneous structures not belonging to any of the above classes. These materials include amines such as cyclizine, chlorcyclizine, meclizine, diphenylpyraline, phenindamine, dimethpyrindene, and clemizole. The structures of all of these amine materials, and others, are set forth in the "Textbook of Organic Medicinal and Pharmaceutical Chemistry," Lippincott Company (1962), which work is incorporated herein by reference.

It should again be stressed that it is the basicity of an amine material, and not its specific structure, which adapts it to use in forming the water-soluble and propellant soluble fatty acid salts of the invention. Although the various complex structures of the above-mentioned physiologically active amines are undoubtedly linked with their physiological activity, there appears to be little correlation between the structure of specific amine materials and their adaptability to use in forming the salts of the present invention. The numerous specific amine materials discussed above are intended merely to be exemplary of physiologically active amines the fatty acid salts of which are of special utility when dissolved in aerosol compositions according to the invention. The resulting compositions can conveniently then be employed for topical application of the amines or in inhalation therapy, for example.

The fatty acid amine salts of the present invention are conveniently made by combining one or more amines with one or more fatty acids in liquid form. Most conveniently, the fatty acid, if solid, is first liquefied by heating and the pure amine base is added to the molten acid in stoichiometric amounts with mixing and stirring. Alternatively, the amines and acids may be reacted by combining them after solution of one or both reactants in one or more solvents, including propellant materials. The salts of the invention may be liquid or solid, depending on the specific amine and fatty acid involved.

Suitable non-toxic volatile liquid or liquefied propellants adaptable for use in formulating aerosol compositions are well known in the aerosol art. These materials are generally fluorinated, chlorinated, or fluorochlorinated saturated lower aliphatic hydrocarbons, or liquefied petroleum gases. Suitably halogenated lower alkanes containing 1 to 4 carbon atoms, preferably 1 or 2 carbon atoms, and at least one fluorine atom, are often generically referred to as "fluorohydrocarbon propellants," and are commercially available under the tradenames "Freons," "Genetrons," "Ucons," etc. These materials include such particularly useful propellants as dichlorodifluoromethane ("Freon 12"), dichlorotetrafluoroethane ("Freon 114"), trichloromonofluoromethane ("Freon 11"), and octafluorocyclobutane ("Freon C-318"). Other examples of suitable propellants are ethyl chloride, 1,1,1-trichloroethane, butane, isobutane, propane, etc.

The propellants, or suitable mixtures thereof (which mixtures are also referred to herein simply as "propellants") are such as produce a desirable vapor pressure for the composition between about 15 and about 60 lbs./sq. in. at room temperature (20–25° C.), preferably between about 20 and about 40 lbs./sq. in. at these temperatures. A combination of propellants particularly suitable for use in the present invention comprises a mixture of about 60 parts by weight of "Freon 12" with 40 parts by weight of "Freon 11." However, it is to be understood that individual "Freons" or mixtures of "Freons" can be employed in the invention in various amounts with the other ingredients mentioned before so that the resulting mixtures show a pressure within the limits recited.

When incorporating the amine salts of the invention in propellant compositions, the salts may be present in amounts of from as little as 0.001% by weight up to the saturation limit of solubility. It is impossible to generalize on the upper limit, since the solubility of a specific salt in a given propellant will vary depending both on the amine and the fatty acid constituent of the salt. However, it can be pointed out by way of specific example that the stearate salts of chlorpheniramine usually form saturated solutions in propellant at a concentration of about 1% by weight, whereas the oleate salts of phenylephrine form saturated solutions in propellants at a concentration of about 0.5%. Propellant compositions containing the fatty acid amine salts of the inventions in saturation concentrations of more than about 5.0% by weight would be unusual.

Where the propellant compositions containing a dissolved fatty acid-amine salt are used merely to dispense the amine in quantity, for example for topical application, they are usually employed with the amine salt being present in high concentration. Where the compositions are used to dispense the amines in measured quantities, as would be desirable for example in the formulation of nasal sprays employing an aerosol container having a metered valve, the concentration of the amine salts in the propellant mixture may be chosen with a view to the amount of propellant dispensed on actuation of the metered valve so that a controlled dose of the amine salt is dispensed on each actuation of the valve. Not surprisingly, the administration of physiologically active amines such as antihistamines and adrenergic amines by inhalation therapy is more efficient than conventional oral administration of these materials. Thus, whereas the usual oral dose of chlorpheniramine, in the form of the maleate salts, is from 1 to 4 milligrams, usually a dose of about 2 mg., the average dose on inhalation therapy is as low as about 0.5 milligram, or from 0.25 to 1 milligram, of chlorpheniramine maleate. When employing chlorpheniramine fatty acid salts according to the invention in a propellant composition, they would be employed in amounts such as would give a dosage on inhalation therapy equivalent to 0.25 to 1 mg. of the corresponding maleate salts.

The salt-containing aerosol compositions of the invention are conveniently and simply prepared by dissolving the prepared salts in the propellant or propellant mixtures, and putting the resulting combination into containers. Alternatively, the salts and propellants may be separately put in containers by conventional cold fill or pressure methods.

The products of the invention are conveniently used in aerosol containers having a metered valve which disperses a controlled quantity of the self-propelling aerosol composition as a single dose. These containers are well known in the art and may be made of any materials, such as glass, plastic, or metal, adequate to contain the pressures generated by the volatile propellant materials therein. Conventionally, these metered containers operate by filling a well of predetermined volume with the self-propelling composition which is dispersed as an aerosol.

A better understanding of the invention and of its many advantages will be had by referring to the following examples, given by way of illustration. The compositions shown were prepared by dissolving the amine salts mentioned in the propellants indicated. The salts were prepared by combining substantially stoichiometric amounts of the amine component with the acid component, the latter being in a liquid or liquefied condition. All percentages are by weight.

*Example 1*

| | Percent |
|---|---|
| Racemic chlorpheniramine oleate | 1.0 |
| Trichloromonofluoromethane | 49.5 |
| Dichlorodifluoromethane | 49.5 |
| | 100.0 |

*Example 2*

| | |
|---|---|
| d-Chlorpheniramine laurate | 1.0 |
| Propellant A | 99.0 |
| | 100.0 |

(Propellant A consists of: Trichloromonofluoromethane 40.0% and dichlorodifluoromethane 60.0%)

*Example 3*

| | |
|---|---|
| d-Chlorpheniramine myristate | 3.0 |
| Propellant B | 97.0 |
| | 100.0 |

(Propellant B consists of: Trichloromonofluoromethane 60.0% and dichlorodifluoromethane 40.0%.)

*Example 4*

| | |
|---|---|
| Racemic chlorpheniramine laurate | 2.0 |
| Isobutane | 98.0 |
| | 100.0 |

*Example 5*

| | |
|---|---|
| d-Chlorpheniramine oleate | 2.0 |
| Ethyl chloride | 98.5 |
| | 100.0 |

*Example 6*

| | |
|---|---|
| d-Chlorpheniramine oleate | 2.0 |
| Propellant W | 98.0 |
| | 100.0 |

(Propellant W consists of: Isobutane 80% and propane 20%.)

*Example 7*

| | |
|---|---|
| d-Chlorpheniramine laurate | 0.2 |
| Isobutane | 9.8 |
| Trichloromonofluoromethane | 45.0 |
| Dichlorodifluoromethane | 45.0 |
| | 100.0 |

*Example 8*

| | |
|---|---|
| Methapyrilene oleate | 1.0 |
| Trichloromonofluoromethane | 49.5 |
| Dichlorodifluoromethane | 49.5 |
| | 100.0 |

*Example 9*

| | |
|---|---|
| d-Chlorpheniramine oleate | 1.0 |
| r-Epinephrine hydrochloride (insoluble) | 0.6 |
| Propellant B (as defined in Example 3) | 98.4 |
| | 100.0 |

*Example 10*

| | |
|---|---|
| d-Chlorpheniramine myristate | 1.0 |
| Proteolytic enzyme concentrate (insoluble) | 1.0 |
| Propellant B (as defined in Example 3) | 98.0 |
| | 100.0 |

*Example 11*

| | Percent |
|---|---|
| d-Chlorpheniramine oleate | 1.0 |
| Penicillin G procaine (insoluble) | 4.0 |
| Propellant B (as defined in Example 3) | 95.0 |
| | 100.0 |

*Example 12*

| | |
|---|---|
| Chlorcyclizine oleate | 1.0 |
| Propellant B (as defined in Example 3) | 99.0 |
| | 100.0 |

*Example 13*

| | |
|---|---|
| d-Chlorpheniramine oleate | 1.0 |
| Talc (insoluble) | 4.0 |
| Propellant B (as defined in Example 3) | 95.0 |
| | 100.0 |

*Example 14*

| | |
|---|---|
| d-Chlorpheniramine laurate | 1.0 |
| Isoproterenol sulfate (insoluble) | 0.2 |
| Propellant B (as defined in Example 3) | 98.8 |
| | 100.0 |

*Example 15*

| | |
|---|---|
| Pseudo ephedrine oleate | 1.0 |
| Trichloromonofluoromethane | 69.5 |
| Dichlorodifluoromethane | 29.5 |
| | 100.0 |

*Example 16*

| | |
|---|---|
| Tripelennamine oleate | 1.0 |
| Propellant B (as defined in Example 3) | 99.0 |
| | 100.0 |

*Example 17*

| | |
|---|---|
| Antazoline oleate | 1.0 |
| Trichloromonofluoromethane | 69.5 |
| Dichlorodifluoromethane | 29.5 |
| | 100.0 |

*Example 18*

| | |
|---|---|
| d-Chlorpheniramine oleate | 0.50 |
| Trichloromonofluoromethane | 49.75 |
| Dichlorodifluoromethane | 49.75 |
| | 100.00 |

*Example 19*

| | |
|---|---|
| d-Amphetamine laurate | 1.0 |
| Propellant B (as defined in Example 3) | 99.0 |
| | 100.0 |

*Example 20*

| | |
|---|---|
| d-Chlorpheniramine butyrate | 1.0 |
| Propellant B (as defined in Example 3) | 99.0 |
| | 100.0 |

*Example 21*

| | |
|---|---|
| Racemic chlorpheniramine stearate | 0.5 |
| Propellant B (as defined in Example 3) | 99.5 |
| | 100.0 |

*Example 22*

| | |
|---|---|
| Ephedrine myristate | 0.75 |
| d-Chlorpheniramine oleate | 0.25 |
| Trichloromonofluoromethane | 69.5 |
| Dichlorodifluoromethane | 29.5 |
| | 100.00 |

Example 23

| | Percent |
|---|---|
| Ephedrine myristate | 0.25 |
| Propellant B (as defined in Example 3) | 99.75 |
| | 100.00 |

Example 24

| | |
|---|---|
| 1-phenylephrine oleate | 0.25 |
| Trichloromonofluoromethane | 72.83 |
| Dichlorodifluoromethane | 26.92 |
| | 100.00 |

Although preferred embodiments have been shown and described herein, it is to be understood that they are illustrative, and are not to be construed as limiting on the scope and spirit of the invention.

What is claimed is:

1. An aerosol composition consisting essentially of a solution of at least one salt of a physiologically active amine having a $pK_a$ value of at least about 7.8 with a monocarboxylic fatty acid having 4–18 carbon atoms dissolved in a liquid propellant selected from the group consisting of liquefied petroleum gases and fluorinated, chlorinated, and fluorochlorinated saturated lower aliphatic hydrocarbons.

2. A composition as in claim 1 which additionally comprises a solid dispersed therein.

3. A composition as in claim 1 wherein said amine is an antihistamine.

4. A composition as in claim 1 wherein said amine is an adrenergic amine.

5. A composition as in claim 1 wherein said amine is selected from the group consisting of chlorpheniramine, ephedrine, phenylephrine, amphetamine, and tripelennamine.

6. A composition as in claim 1 wherein said fatty acid is selected from the group consisting of lauric, myristic, oleic, and stearic acids.

7. A composition as in claim 1 wherein said salt is chlorpheniramine oleate.

8. A composition as in claim 1 wherein said salt is chlorpheniramine laurate.

9. A composition as in claim 1 wherein said salt is chlorpheniramine myristate.

10. A composition as in claim 1 wherein said monocarboxylic fatty acid has 12 to 18 carbon atoms.

References Cited by the Examiner

UNITED STATES PATENTS

| | | | |
|---|---|---|---|
| 1,861,543 | 6/1932 | Moore et al. | 260—404 |
| 2,015,408 | 9/1935 | Nabenhauer | 260—404 |
| 2,027,126 | 1/1936 | Stover et al. | 260—404.5 X |
| 2,246,529 | 6/1941 | Nabenhauer | 167—65 X |
| 2,293,874 | 8/1942 | Woodruff | 260—404 X |
| 2,293,877 | 8/1942 | Woodruff | 260—404 X |
| 2,298,630 | 10/1942 | Shelton | 167—54 X |
| 2,408,345 | 9/1946 | Shelton et al. | 167—54 X |
| 2,427,878 | 9/1947 | Rieveschl | 167—65 X |
| 2,453,729 | 11/1948 | Rieveschl | 167—65 X |
| 2,464,284 | 3/1949 | Alles | 167—65 |
| 2,482,377 | 9/1949 | Shelton et al. | 167—54 X |
| 2,520,015 | 8/1950 | Rohrmann | 167—65 |
| 2,655,509 | 10/1953 | Mills | 167—65 X |
| 2,707,696 | 5/1955 | Worne | 167—65 |
| 2,789,138 | 4/1957 | Heinzelman et al. | 167—65 X |
| 2,831,016 | 4/1958 | Rabjohn | 260—404 X |
| 2,843,595 | 7/1958 | Engelhard et al. | 260—296 |
| 2,991,289 | 7/1961 | Schulte | 260—296 |
| 3,014,844 | 12/1961 | Thiel et al. | 167—82 |
| 3,050,559 | 8/1962 | Burger | 167—65 X |
| 3,078,307 | 2/1963 | Craig et al. | 167—65 X |
| 3,095,355 | 6/1963 | Abramson et al. | 167—54 |
| 3,096,241 | 7/1963 | Hayes et al. | 167—65 |
| 3,097,212 | 7/1963 | Jucker et al. | 167—65 X |
| 3,106,511 | 10/1963 | Cuttler et al. | 167—54 |
| 3,150,050 | 9/1964 | Safrin et al. | 167—94 |

LEWIS GOTTS, *Primary Examiner.*

NICHOLAS RIZZO, *Examiner.*

ROBERT T. BOND, SHEP ROSE, *Assistant Examiners.*